United States Patent [19]
Kikuchi et al.

[11] Patent Number: 6,109,085
[45] Date of Patent: Aug. 29, 2000

[54] FORMING APPARATUS USING A PAIR OF ROLLERS

[75] Inventors: Daisuke Kikuchi; Kazuhiro Watanabe, both of Tochigi, Japan

[73] Assignee: Calsonic Corporation, Tokyo, Japan

[21] Appl. No.: 09/414,168

[22] Filed: Oct. 8, 1999

[51] Int. Cl.[7] .............................. B21B 31/07; B21B 35/00
[52] U.S. Cl. ............................................. 72/238; 72/249
[58] Field of Search ............................ 72/249, 238, 239, 72/237, 379.6, 252.5, 247

[56] References Cited

U.S. PATENT DOCUMENTS

| | | | |
|---|---|---|---|
| 3,020,735 | 2/1962 | Wegmann | 72/249 |
| 3,901,060 | 8/1975 | Corradini | 72/249 |
| 4,368,633 | 1/1983 | Nogota | 72/238 |
| 5,761,945 | 6/1998 | Vandenbroucke | 72/249 |

FOREIGN PATENT DOCUMENTS

| | | |
|---|---|---|
| 3-166023 | 7/1991 | Japan . |
| 3-199896 | 8/1991 | Japan . |
| 4-35831 | 3/1992 | Japan . |
| 4-113113 | 10/1992 | Japan . |
| 6-114455 | 4/1994 | Japan . |
| 9-85541 | 3/1997 | Japan . |
| 9-85542 | 3/1997 | Japan . |
| 11-70424 | 3/1999 | Japan . |

*Primary Examiner*—Rodney Butler
*Attorney, Agent, or Firm*—Foley & Lardner

[57] ABSTRACT

The forming apparatus including: at least one forming roller; a roller shaft, on which the forming roller is attached; a pair of mutually spaced apart bearing stands, on each of which the roller shaft is rotatably and axially supported; a first coupling arranged on the roller shaft to serve as an axial positioning of the forming roller; and a second coupling releasably coupled to the first coupling, the roller shaft being divided into a first shaft (8A) rotatably and axially supported on one of the pair of bearing stands and a second shaft rotatably and axially supported on the other of the pair of bearing stands, both the first coupling and the forming roller being removably attached on the divided end of the first shaft, the second coupling being fixedly attached onto a divided end of the second shaft, and the second shaft being further slidably supported on the other of the pair of bearing stands by a slide stroke by which a spatial interval from the divided end of the second shaft to the divided end of the first shaft is enabled to be secured to allow removing and attaching operations for at least the first coupling and the forming roller.

9 Claims, 3 Drawing Sheets

FORMING APPARATUS USING A PAIR OF ROLLERS

BACKGROUND OF THE INVENTION a) Field of the Invention

The present invention relates generally to an assembling system for assembling heat exchangers of automotive air conditioners. The present invention particularly relates to a manufacturing apparatus for manufacturing outer fins from among manufacturing apparatuses, in the assembling system, for manufacturing header pipes, with flat plates formed cylindrically by means of a press forming, for manufacturing heat transfer tubes, with belt-like plates being formed to letter-U shaped holders by means of a roll forming, inner fins manufactured by means of the press forming, a roll forming, and so on being inserted into the respective holders, for manufacturing the outer fins, with belt-like plates formed into corrugated profiles by means of corrugated cutters, and for assembling the header pipes manufactured by the head pipe manufacturing apparatus into respective spaces between alternatingly overlapped portions of the heat transfer pipes manufactured by the heat transfer pipe manufacturing apparatus and the outer fins manufactured by the outer fin manufacturing apparatus.

That is to say, the present invention, specifically, relates to a forming apparatus using a pair of upper and lower forming rollers to manufacture the outer fins described above.

The forming apparatus is used to form a metallic plate (a metallic sheet) to any desired corrugated form by means of the pair of forming rollers.

b) Description of the Related Art

In a case where the metallic plate is, for example, formed into a desired corrugated form, a pair of upper and lower forming rollers have been used whose peripheral surfaces have a plurality of teeth, each teeth having a shape corresponding to each waveform, viz., a corrugation of the metallic plate to be formed. A supporting form of each forming roller is such that a roller shaft attached to the corresponding one of the pair of forming rollers are rotatably and axially supported on a single bearing stand and the corresponding one of the pair of forming rollers is attached to one end of the roller shaft. This may be called a single end supporting structure. Another supporting form of each forming roller is such that both ends of each of the roller shafts to which the corresponding forming roller is attached are rotatably and axially supported on a pair of bearing stands (so-called, both end supporting structure).

SUMMARY OF THE INVENTION

For example, in a case where plural kinds of the corrugated metallic plates whose waveform profiles and pitch length are mutually different are to be formed, the pair of upper and lower forming rollers having the peripheral surfaces in the plurality of teeth whose pitches are met with the waveform profiles of the metallic plate to be formed are used.

In the case of the former single end supporting structure, it is relatively easy to removably attach the corresponding one of the pair of the forming rollers to the end of the corresponding one of the roller shafts. In addition, in this case, only by exchanging each of the pair of forming rollers with another pair of forming rollers whose peripheral surfaces have teeth of different pitches or different waveform profiles, the desired corrugation can be formed onto the metallic plate. However, since the roller shafts to each end of which the corresponding one of the upper and lower forming rollers is attached are supported on the corresponding bearing stand (the single roller shaft (end) supporting structure), a supporting rigidity of each roller shaft on the corresponding bearing stand is low so that the forming operation on the metallic plate may become unstable.

On the other hand, no problem of the supporting rigidity occurs in the case of both end supporting structure described in the BACKGROUND OF THE INVENTION, as compared with the single end supporting structure. However, in a previously proposed forming apparatus in which the both end supporting structure is adopted, an exchange (or replacement) of only each of the forming rollers cannot be carried out with each of the roller shafts axially supported on the pair of mutually spaced apart bearing stands. Thus, the previously proposed forming apparatus provides a self-contained apparatus only forming the metallic plate in the single kind of corrugation. Hence, in order to form the metallic plate in various kinds of corrugations, the whole apparatus is needed to be exchanged or replaced. This is disadvantageous in terms of a cost performance and an installation space.

It is an object of the present invention to provide an improved forming apparatus having a structure which gives an easy exchange (or replacement) of at least one or both of the pair of upper and lower forming rollers with another one or other ones and in which the adoption of the above-described both end supporting structure is maintained.

The above-described object can be achieved by providing a forming apparatus, comprising: at least one forming roller (7); a roller shaft (8), on which the forming roller is attached; a pair of mutually spaced apart bearing stands (3, 4), on each of which the roller shaft is rotatably and axially supported; a first coupling (17) arranged on the roller shaft to serve as an axial positioning of the forming roller; and a second coupling (19) releasably coupled to the first coupling, wherein the roller shaft (8) is divided into a first shaft (8A) rotatably and axially supported on one (3) of the pair of bearing stands and a second shaft (8B) rotatably and axially supported on the other (4) of the pair of bearing stands, both the first coupling (17) and the forming roller (7) are removably attached on the divided end of the first shaft (8A), the second coupling (19) is fixedly attached onto a divided end of the second shaft (8B), and the second shaft (8B) is further slidably supported on the other of the pair of bearing stands by a slide stroke by which a spatial interval from the divided end of the second shaft to the divided end of the first shaft is enabled to be secured to allow removing and attaching operations for at least the first coupling and the forming roller.

DETAILED DESCRIPTION OF THE PREFERRED EMBODIMENT

Reference will hereinafter be made to the drawings in order to facilitate a better understanding of the present invention.

Figure 1:
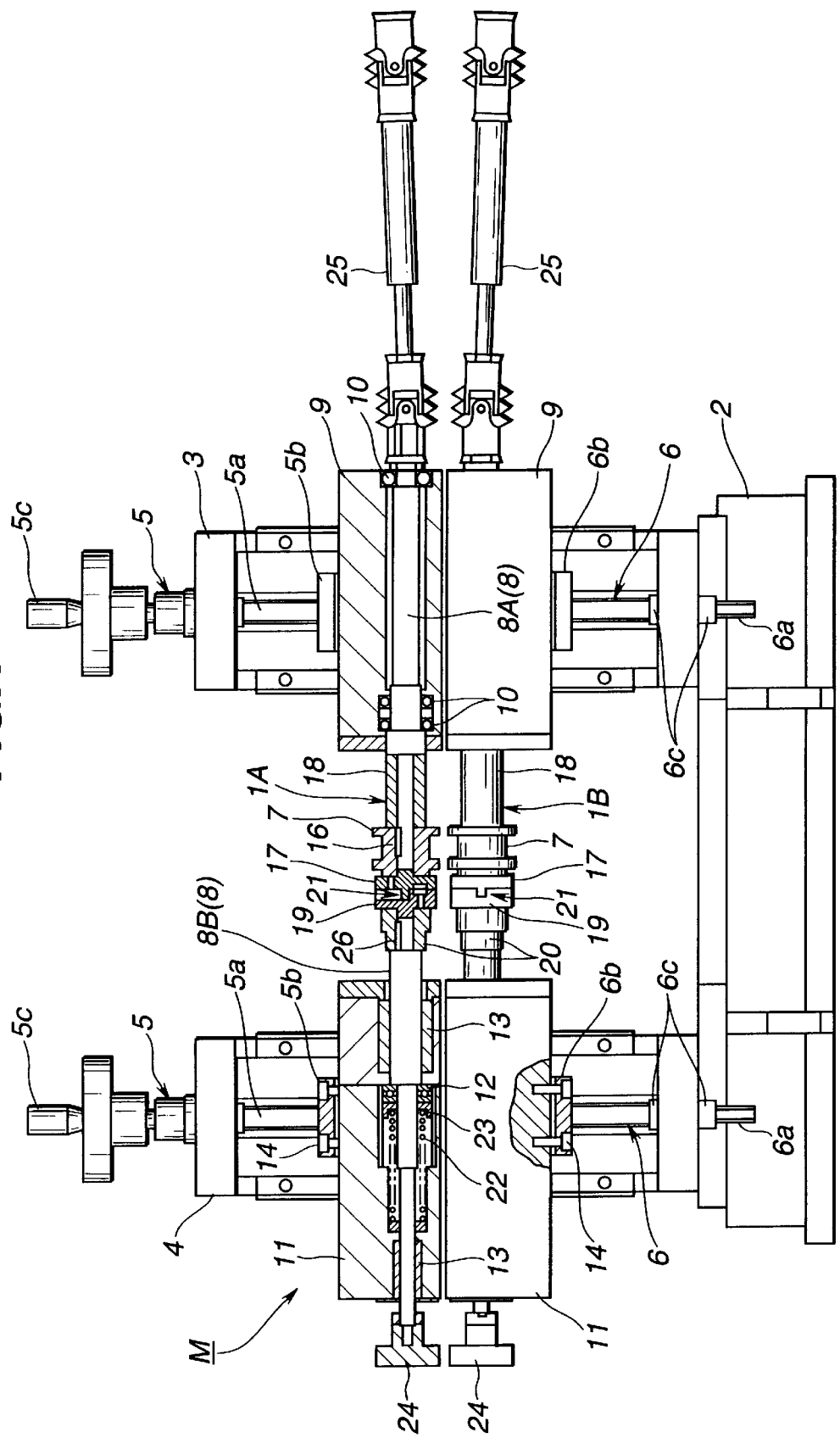
FIG. 1 is a partially cross sectioned elevational view of a forming apparatus in a preferred embodiment according to the present invention.

FIG. 1 shows a preferred embodiment of a forming apparatus according to the present invention.

In FIG. 1, a pair of upper and lower rollers 1A and 1B are supported on a pair of bearing stands 3 and 4 in a stride form between the pair of bearing stands 3 and 4. That is to say, each end of the pair of upper and lower rollers 1A and 1B is supported on the corresponding end of each of the pair of bearing stands 3 and 4. The pair of upper and lower forming rollers 1A and 1B are vertically disposed on a stand base 2.

The upper roller 1A is attached onto a pair of upper roller height adjusting mechanisms 5, each being installed on the corresponding one of the pair of the bearing stands 3 and 4. On the other hand, the lower roller 1B (the other of the pair of forming rollers) is attached onto a pair of lower roller height adjusting mechanisms 6. Each pair of height adjusting screws 5a and 5a and 6a and 6a in the respective pairs of upper and lower roller height adjusting mechanisms 5 and 6 is used to adjust each height of the upper and lower rollers 1A and 1B. Then, a spatial interval of distance between forming rollers 7 and 7 can arbitrarily be adjusted. The detailed description on the forming rollers 7 and 7 will be described later.

A pair of bearing main bodies 9 and 9 of the upper roller 1A is fixed by means of a bolt 14 on a retainer 5b fixedly attached on a lower end of the height adjusting screw 5a of the corresponding one of the pair of upper roller height adjusting mechanisms 5.

Another pair of bearing main bodies 11 and 11 of the lower roller 1B is fixed by means of a bolt 14 on a retainer 6b fixedly attached on an upper end of the height adjusting screw 6a of the corresponding one of the pair of lower rollers 1B.

Next, each of a pair of roller shafts 8 onto which each of forming rollers 7 constituting the upper and lower rollers 1A and 1B and a second shaft 8B. The first shaft 8A is rotatably and axially supported via a ball bearing 10 on the corresponding bearing main body 9 of the corresponding one 3 of the pair of bearing stands 3 and 4. The second shaft 8B is rotatably and axially supported via a ball bearing (thrust bearing) 12 and a bearing bush 13 on the bearing main body 11 of the corresponding one 4 of the pair of bearing stands 3 and 4.

Each forming roller 7 is removably fitted into a divided end of the corresponding first shaft 8A in its axial direction and a rotation about its axis center is stopped by means of a corresponding first key 16.

An axle portion integrally projected from a rear surface of a first coupling 17 is inserted from an external to each roller 7 into a center hole of each corresponding forming roller 7. Thereafter, the first coupling 17 is fixed to the end surface of the corresponding roller 7 by means of a bolt (not shown). Then, a spacer collar 18 inserted into the first shaft 8A with a clearance to the first shaft 8A and the first coupling 17 are used to perform a positioning of the corresponding forming roller 7 in its axial direction.

Each contacting surface of the first coupling 17 and second coupling 19 is integrally linked to each other by means of a convex-and-recess engagement device 21. Each contacting surface thereof may be linked to each other by means of a bolt-and-nut type engagement device (not shown).

The second shaft 8B is slidably and axially supported on the corresponding bearing main body 4 by means of the bearing bush 13 described above. A slide stroke of the second shaft 8B is set to a stroke such as to be enabled to secure a spatial interval in which removing and attaching operations of the first coupling 17 and forming roller 7 can be carried out.

Next, a compression coil spring 22 as a biasing device is disposed within the corresponding bearing main body 11 around the axis of the second shaft 8B. A spring force of the compression coil spring 22 biases the second shaft 8A toward the first shaft 8A via a movable spring sheet 23 and the thrust bearing 12 and presses the second coupling 19 against the first coupling 17 so that the convex-and-recess engagement state of these couplings is not released.

In addition, the other end of the second shaft 8B is projected so as to be exposed externally to the corresponding bearing main body 11. An operation knob 24 is fixedly fitted to the other end of the corresponding second shaft 8B.

In FIG. 1, 5c denotes each adjustment operation handle on the height adjustment screw 5a of the corresponding one of the upper roller height adjusting mechanisms 5, 6c denotes each adjustment nut spirally attached on the corresponding height adjustment screw 5c of the lower roller height adjusting mechanism 6, and 25 denotes a driving force transmission shaft coupled to the other end of the corresponding first shaft 8A for transmitting a rotating power of a drive source (not shown).

It is noted that internal structures of the other of the forming rollers 7 located at the lower side in FIG. 1 and the other of the pair of bearing main bodies 9 and 11 located at the lower side in FIG. 1 are the same as those located at the upper side in FIG. 1.

In the structure of the embodiment described above, each roller shaft 8 is rotatably and axially supported on the pair of bearing stands 3 and 4 in the stride form between the pair of bearing stands 3 and 4 (so-called, both end supporting structure). Hence, a high supporting rigidity can be assured.

Each roller shaft 8 is, as described above, divided into the first shaft 8A and the second shaft 8B. The first shaft 8A is rotatably and axially supported on the corresponding bearing main body 9 of the corresponding one (3) of the bearing stands 3 and 4. The second shaft 8B is rotatably and axially supported on the bearing main body 11 of the corresponding one 4 of the bearing stands 3 and 4. Onto the divided end of the first shaft 8A, the corresponding forming roller 7 and the first coupling 17 are removably attached in its axial direction. Onto the divided end of the second shaft 8B, the second coupling 19 is fixedly attached.

Hence, if the coupling between these first and second couplings 17 and 19 is released (in the embodiment shown in FIG. 1, the second shaft 8B is slid in the rearward direction away from its normal position to release the convex-and-recess engaging device 21 of the respective couplings 17 and 19) and the second shaft 8B is slid in the rearward directions by the predetermined slide stroke, the spatial interval between the first and second couplings 17 and 19 for the first coupling 17 and forming roller 7 to be inserted and to be attached can be secured.

Hence, both of the first coupling 17 and forming roller 7 can easily be removed from the divided end 8A of the corresponding first coupling 17 and the corresponding forming roller 7.

Hence, only the forming roller 7 can be replaced (exchanged) with another one according to a purpose of forming so that the whole forming apparatus M is not a self-contained machine to only form the metallic sheet in the single corrugated form. Consequently, such a forming apparatus as described in the embodiment can be cost-effective and space saving.

In addition, the second shaft 8B is biased axially toward the first shaft 8A by means of the compression coil spring 22. Hence, after the corresponding forming roller 7 and the first coupling 17 have become attached to the divided end of the first shaft 8A, the spring force of the compression coil spring 22 can automatically return the second shaft 8B toward the direction of the first shaft 8A. Hence, the convex-and-recess engaging device 21 between the first and second couplings 17 and 19 can be used to tightly engage these couplings 17 and 19.

At the same time of the linkage (couplings) between both couplings 17 and 19, the corresponding forming roller 7 can be fixed so that the roller replacement (exchange) operation can easily be carried out.

In addition, the rearward (retraction) movement of the second shaft 8B can easily be carried out by an operator's grasping the corresponding operation knob 24 attached to the other end of the corresponding second shaft 8B.

The pair of upper and lower roller shafts (8, 8) are juxtaposed to each other with a predetermined vertical spatial interval therebetween, as shown in FIG. 1.

Figure 2:
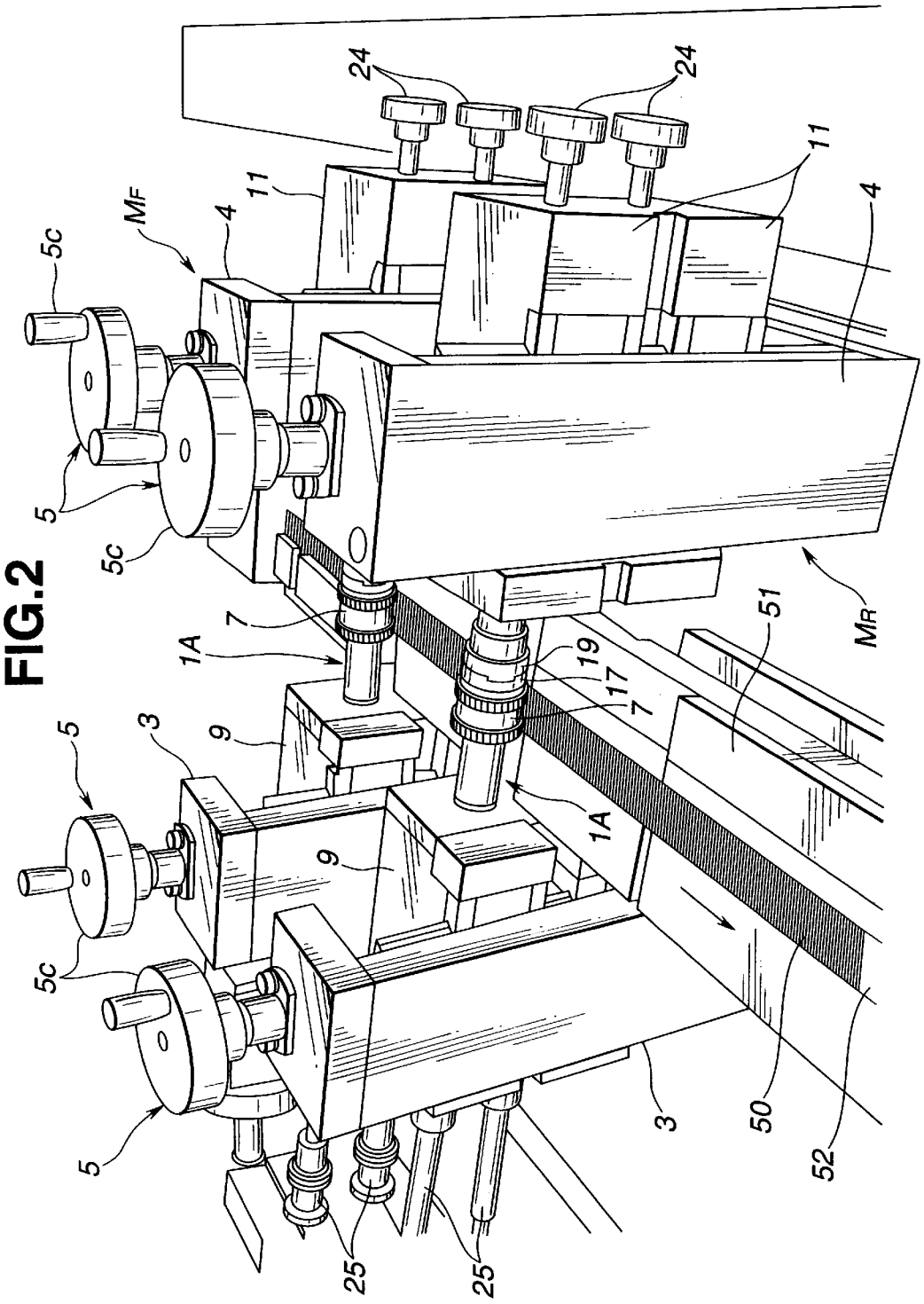
FIG. 2 is a perspective view representing an example of an application of two sets of the same forming apparatuses, each shown in FIG. 1, to a waveform pitch adjusting mechanism for a corrugated metallic plate.

FIG. 2 shows two sets of the forming apparatus M, each forming apparatus M being shown in FIG. 1, applicable to a pitch adjusting mechanism which adjusts a length of a pitch between each tooth (corrugation) in a corrugated form of a belt-like corrugated metallic plate.

The corrugated metallic plate 50 is continuously formed in a predetermined corrugation shape by means of a cutter roll apparatus (not shown) is guided on a guide surface 52 on a leveled operation board 51 to limit a deviation movement in its width direction of the operation board 51 and is fed in an arrow-marked direction of FIG. 2.

The two sets of the forming apparatuses M are arranged at a front side $M_F$ and a rear side $M_R$ along a feed line for the corrugated metallic plate 50.

Each forming roller 7F (having the same diameter) on the front side forming apparatus MF has a pitch of a continuous convex-and-recess (so called, between one period of each wave (corrugation)) formed tooth on its peripheral surface smaller than the continuous convex-and-recess formed tooth of the cutter roll apparatus (not shown). A roller rotation velocity of the front side forming apparatus $M_F$ is set to be slower than the roller rotation velocity of the cutter roll apparatus.

Figure 3:
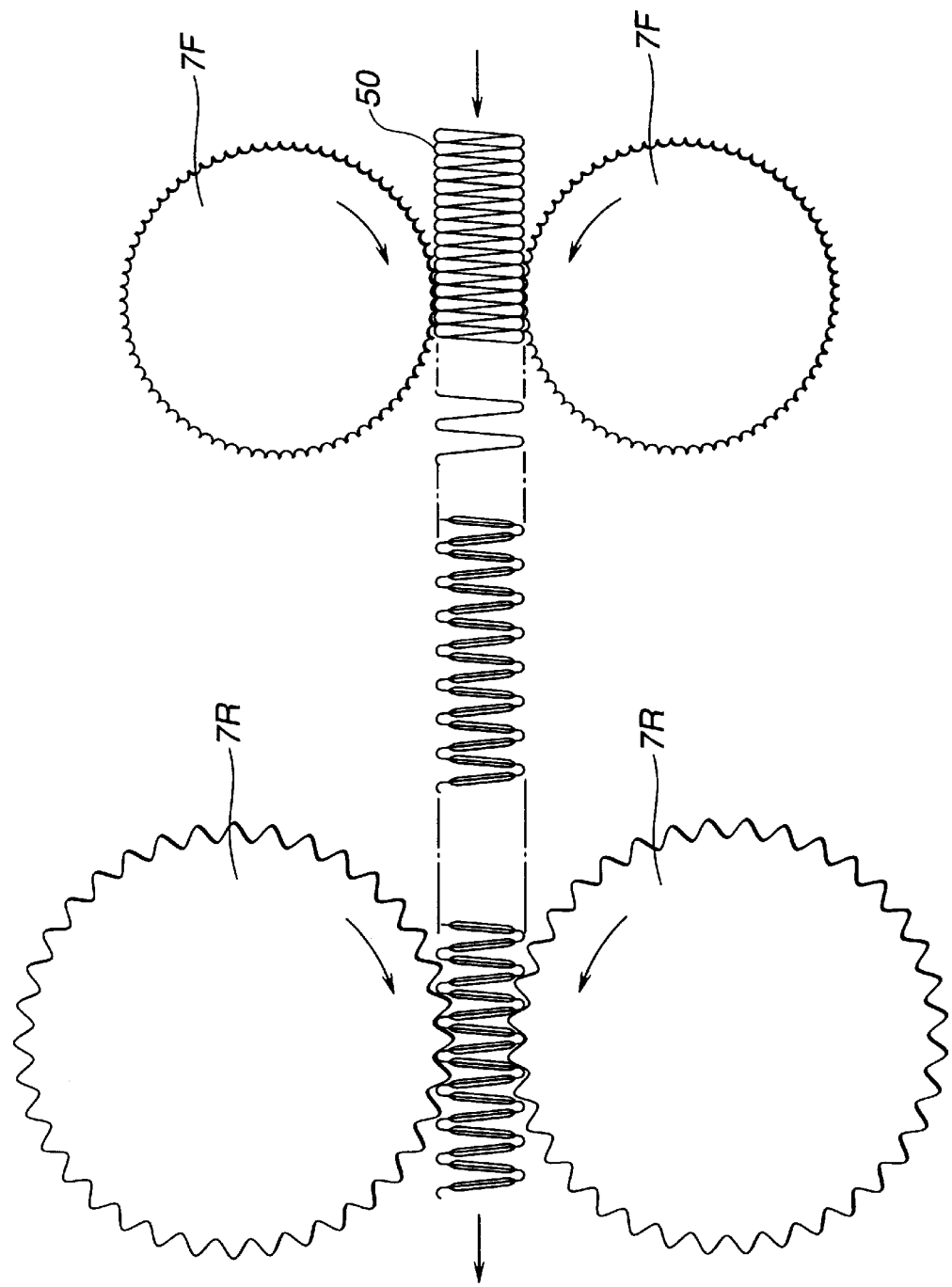
FIG. 3 is an explanatory view representing a relationship between forming rollers on the respective forming apparatuses shown in FIG. 2 and the fed corrugated metallic plate.

As shown in FIG. 3, each forming roller 7R (having the same diameter) of the rear side forming apparatus $M_R$ has a pitch of the same continuous convex-and-recess formed tooth (corrugation) on its peripheral surface larger than the continuous convex-and-recess formed tooth of each forming roller 7R on the rear side forming apparatus $M_R$. The roller rotation velocity of the rear side forming apparatus $M_R$ is faster than that of the front side forming apparatus $M_F$.

Hence, the corrugated metallic plate 50 which has been shaped in the corrugated form by means of the cutter roll apparatus (not shown) and fed to the front side forming apparatus $M_F$ is meshed between the convex-and-recess formed teeth (corrugations) of the mutually opposing forming rollers 7F and 7F at the front side forming apparatus $M_F$. At this time, a feed velocity of the corrugated metallic plate 50 is decreased by means of the (front side) forming rollers 7F and 7F.

On the other hand, the corrugated metallic plate 50 fed to the rear side forming apparatus $M_R$ is meshed between the convex-and-recess formed teeth (corrugations) of the mutually opposing forming rollers 7F and 7F at the rear side forming apparatus MR.

The feed velocity of the corrugated metallic plate 50 is increased by means of the (rear side) forming rollers 7R and 7R.

Therefore, each waveform of the corrugated metallic plate 50 is expanded between the (in the front side forming apparatus) forming rollers 7F and 7F and between the (in the rear side forming apparatus) forming rollers 7R and 7R to provide preliminarily adjust a required pitch. A corrective reforming action of each waveform (corrugation) of the corrugated metallic plate 50 which is carried out at the position between the mutually opposing forming rollers 7R and 7R causes the pitch of each continuous waveform (corrugation) as the corrugated metallic plate 50 to be regularly adjusted and the reshaped corrugated metallic plate 50 is fed out from the rear side forming apparatus $M_R$.

In a case where the forming apparatus M according to the present invention is applied as the waveform pitch adjusting mechanism for the corrugated metallic plate 50, it is necessary to exchange the forming rollers 7F and 7R with each other if the waveform pitch of the corrugated metallic plate 50 is modified.

Such an exchange operation between the front and rear side rollers 7F and 7R as described above is carried out as follows: With one of the operation knobs 24 grasped, the corresponding second shaft 8B of each of the upper and lower roller shafts 8 is slid in the rearward (retraction) direction toward the corresponding knob 24. This is also carried out in the same way for the other roller shaft 8. Consequently, each forming roller 7F and 7F and 7R and 7R can easily be removed and attached to the corresponding forming apparatus $M_F$ and $M_R$ according to their necessities.

The entire contents of a Japanese Patent Application No. Heisei 10-99560 (filed in Japan on Apr. 10, 1998) are incorporated herein by reference.

Although the invention has been described above by reference to certain embodiment of the invention, the invention is not limited to the embodiments described above, Modifications and variations of the embodiments described above will occur to those skilled in the art in light of the above teachings.

The scope of the invention is defined with reference to the following claims.

What is claimed is:

1. A forming apparatus, comprising:
   at least one forming roller (7);
   a roller shaft (8), on which the forming roller is attached;
   a pair of mutually spaced apart bearing stands (3, 4), on each of which the roller shaft is rotatably and axially supported;
   a first coupling (17) arranged on the roller shaft to serve as an axial positioning of the forming roller; and
   a second coupling (19) releasably coupled to the first coupling, wherein the roller shaft (8) is divided into a first shaft (8A) rotatably and axially supported on one (3) of the pair of bearing stands and a second shaft (8B) rotatably and axially supported on the other (4) of the pair of bearing stands, both the first coupling (17) and the forming roller (7) are removably attached on the divided end of the first shaft (8A), the second coupling (19) is fixedly attached onto a divided end of the second shaft (8B), and the second shaft (8B) is further slidably supported on the other of the pair of bearing stands by a slide stroke by which a spatial interval from the divided end of the second shaft to the divided end of the first shaft is enabled to be secured to allow removing and attaching operations for at least the first coupling and the forming roller.

2. A forming apparatus as claimed in claim 1, further comprising a biasing device (22) to bias the second shaft (8B) toward the first shaft (8A) in an axial direction of the second shaft (8B).

3. A forming apparatus as claimed in claim 1, further comprising: another forming roller (7); another roller shaft (8) rotatably and axially supported on the pair of mutually spaced apart bearing stands and on which the other forming roller is attached; another first coupling (17) arranged on the other roller shaft to serve as the axial positioning of the other forming roller (7); and another second coupling (19) releasably coupled to the other first coupling, wherein the other roller shaft (8) is divided into another first shaft (8A) rotatably and axially supported on one (3) of the pair of bearing stands and another second shaft (8B) rotatably and axially supported on the other (4) of the pair of bearing stands, both the other first coupling (17) and the other forming roller (7) are removably attached onto the divided end of the other second shaft (8B), and the other second shaft (8B) is further slidably supported on the other of the pair of bearing stands by the same slide stroke by which another spatial interval from the divided end of the other second shaft to the divided end of the first shaft is enabled to be secured to allow removing and attaching operations for at least the other first coupling and the other forming roller, and wherein the other roller shaft (8) is juxtaposed to the one roller shaft (8) with a predetermined spatial interval therebetween.

4. A forming apparatus as claimed in claim 2, wherein the other end of the second shaft (8B) is projected toward an outside of the other (4) of the pair of bearing stands and further comprising an operation knob (24) on the other end of the second shaft (8B).

5. A forming apparatus as claimed in claim 4, further comprising an engaging device (21), the engaging device being located between mutually opposing surfaces of the first and second couplings (17, 19) to releasably engage the second coupling with the first coupling so as to be integrally linked together.

6. A forming apparatus as claimed in claim 5, wherein the other (4) of the pair of bearing stands includes: at least one bearing main body (11); a ball bearing (12) located within the bearing main body (11) on which the second shaft (8B) is axially and rotatably supported; and a pair of bearing bushes (13) each located adjacent to the ball bearing.

7. A forming apparatus as claimed in claim 6, wherein the biasing device comprises a compression spring (22) wound around the second shaft (8B), one end thereof being attached to a movable spring seat (23) movably attached to the ball bearing and wherein a spring force of the compression coil spring causes the second shaft (8B) to be biased toward the first shaft (8A) via the movable spring seat (23) and the ball bearing (12) so as to press the second coupling toward the first coupling to prevent the engagement between the first and second couplings via the engagement device (21) from being released.

8. A forming apparatus as claimed in claim 7, wherein when the operation knob is used to retract the second shaft (8B) toward the outside direction of the bearing main body (11) by the slide stroke against the spring force of the compression coil spring, the engagement between the first and second couplings by means of the engaging device is enabled to be released.

9. A forming apparatus as claimed in claim 8, wherein the predetermined spatial interval between the other roller shaft (8) and the one roller shaft (8) is adjusted by means of a height adjusting mechanism (5, 5) according to a diameter of each forming roller.

\* \* \* \* \*